United States Patent
Coleman et al.

(10) Patent No.: US 6,318,200 B1
(45) Date of Patent: Nov. 20, 2001

(54) TRIPLE REDUCTION FINAL DRIVE ASSEMBLY

(75) Inventors: David LeRoy Coleman; Donald Charles Kaukaskie, both of Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/428,345

(22) Filed: Oct. 27, 1999

(51) Int. Cl.⁷ .................................................. F16H 1/20
(52) U.S. Cl. ..................... 74/421 R; 180/9.62; 74/421 A
(58) Field of Search .................. 74/411.5, 413, 74/414, 417, 420, 432, 445, 421 A, 421 R, 331, 606 R, 15.4, 453, 841, 422; 180/9.62, 337, 343; 475/103; 384/588, 453, 547, 416; 192/221

(56) References Cited

U.S. PATENT DOCUMENTS

| | | | |
|---|---|---|---|
| 1,959,533 | * | 5/1934 | Iverson ................................. 475/103 |
| 3,739,652 | * | 6/1973 | Caldwell et al. .................... 74/421 A |
| 3,771,381 | * | 11/1973 | Holzhauser et al. ................ 74/421 R |
| 4,063,464 | * | 12/1977 | Crabb ....................................... 74/331 |
| 4,271,942 | * | 6/1981 | Ballendux ............................. 74/15.4 |
| 4,307,621 | * | 12/1981 | Merron ................................. 74/421 A |
| 4,513,869 | * | 4/1985 | Goudy .................................... 384/453 |
| 4,658,662 | * | 4/1987 | Rundle .................................... 74/331 |
| 4,688,448 | * | 8/1987 | Hollis et al. ............................ 74/841 |
| 4,739,852 | * | 4/1988 | Stevens et al. ....................... 180/9.62 |
| 5,600,905 | * | 2/1997 | Kallenberger et al. ............. 180/9.62 |
| 5,603,174 | * | 2/1997 | Kallenberger et al. ............. 180/9.62 |
| 5,682,799 | * | 11/1997 | Dimov ................................. 74/606 R |
| 5,737,965 | * | 4/1998 | Crain et al. ............................. 74/422 |

OTHER PUBLICATIONS

Deere & Company Brochure entitled "Fundamentals of Service– Power Trains", ISBN 0–86691–009–3, FOS–40, cover and pp. 8–1 thr 8–8, printed in the U.S.A.

\* cited by examiner

Primary Examiner—David A. Bucci
Assistant Examiner—Colby Hansen

(57) ABSTRACT

A triple reduction final drive assembly for a work vehicle comprises a first input spur gear, a first cluster gear, a second cluster gear and an output spur gear that are located in a housing. The output spur gear is provided with an output shaft which is rotatively mounted on bearings in the housing. The first cluster gear rotates on annular bearings that encircle a portion of the output shaft. The first cluster gear and output spur gear define coaxial drive axes. The second cluster gear is also rotatively mounted on bearings located in the housing. The second cluster gear defines a drive axis that is parallel to and spaced apart from the drive axes of the first cluster gear and the output spur gear. The first cluster gear is provided with a first toothed surface and a second toothed surface. The first toothed surface of the first cluster gear engages the input spur gear thereby defining the first gear reduction. The second cluster gear is also provided with a first toothed surface and a second toothed surface. The first toothed surface of the second cluster gear engages the second toothed surface of the first cluster gear thereby defining the second gear reduction. The second toothed surface of the second cluster gear engages the output spur gear thereby defining the third gear reduction.

11 Claims, 4 Drawing Sheets

TRIPLE REDUCTION FINAL DRIVE ASSEMBLY

BACKGROUND OF THE INVENTION

1. Field of the Invention

The present invention is directed to a triple reduction final drive assembly for a work vehicle which is both compact and relatively inexpensive to manufacture.

2. Description of the Prior Art

Work vehicles are typically powered by an internal combustion engine that drives a transmission. The rotating output of the transmission is directed to the drive wheels or sprockets by a final drive assembly. Typically the final drive assembly includes a gear reduction which reduces the speed applied to the drive wheels or sprockets and increases torque, thereby lowering stress and simplifying the transmission. Three major types of final drives that offer gear reduction are pinion final drives, planetary final drives and chain final drives.

In a pinion final drive, a pinion gear operatively engages the transmission output shaft and drives a larger spur gear, thereby reducing the output speed of the spur gear and increasing torque. Additional pinions and spur gears can be added to increase the gear reduction function, but this requires increased space and cost.

Planetary final drives are more compact than pinion final drives resulting in a greater gear reduction in a smaller package. However planetary final drives are more costly to manufacture.

Chain final drives result in the most clearance over pinion and planetary final drives, but have a tendency to loosen due to wear and stretching.

SUMMARY OF THE INVENTION

It is an object of the invention to provide a compact and relatively inexpensive triple reduction final drive assembly for a work vehicle.

It is a feature of the invention that a first cluster gear and the output shaft of the output spur gear have coaxial drive axes.

It is another feature of the invention that the present triple reduction final drive is formed of pinion gears and spur gears that require only three gear rotating shafts.

The present triple reduction final drive assembly for a work vehicle comprises a first input spur gear, a first cluster gear, a second cluster gear and an output spur gear that are located in a housing. The output spur gear is provided with an output shaft which is rotatively mounted on bearings in the housing. The first cluster gear rotates on annular bearings that encircle a portion of the output shaft. The first cluster gear and output spur gear define coaxial drive axes. The second cluster gear is also rotatively mounted on bearings located in the housing. The second cluster gear defines a drive axis that is parallel to and spaced apart from the drive axes of the first cluster gear and the output spur gear. The first cluster gear is provided with a first toothed surface and a second toothed surface. The first toothed surface of the first cluster gear engages the input spur gear thereby defining the first gear reduction. The second cluster gear is also provided with a first toothed surface and a second toothed surface. The first toothed surface of the second cluster gear engages the second toothed surface of the first cluster gear thereby defining the second gear reduction. The second toothed surface of the second cluster gear engages the output spur gear thereby defining the third gear reduction.

The housing is also provided with a spring applied hydraulically released parking brake that engages an input sleeve that is coupled to the output shaft of the transmission and the input spur gear. The input sleeve is provided with exterior splines for engaging the spring applied hydraulically released brake and internal splines for engaging the output shaft of the transmission and the input spur gear.

Detailed Description

Figure 1:
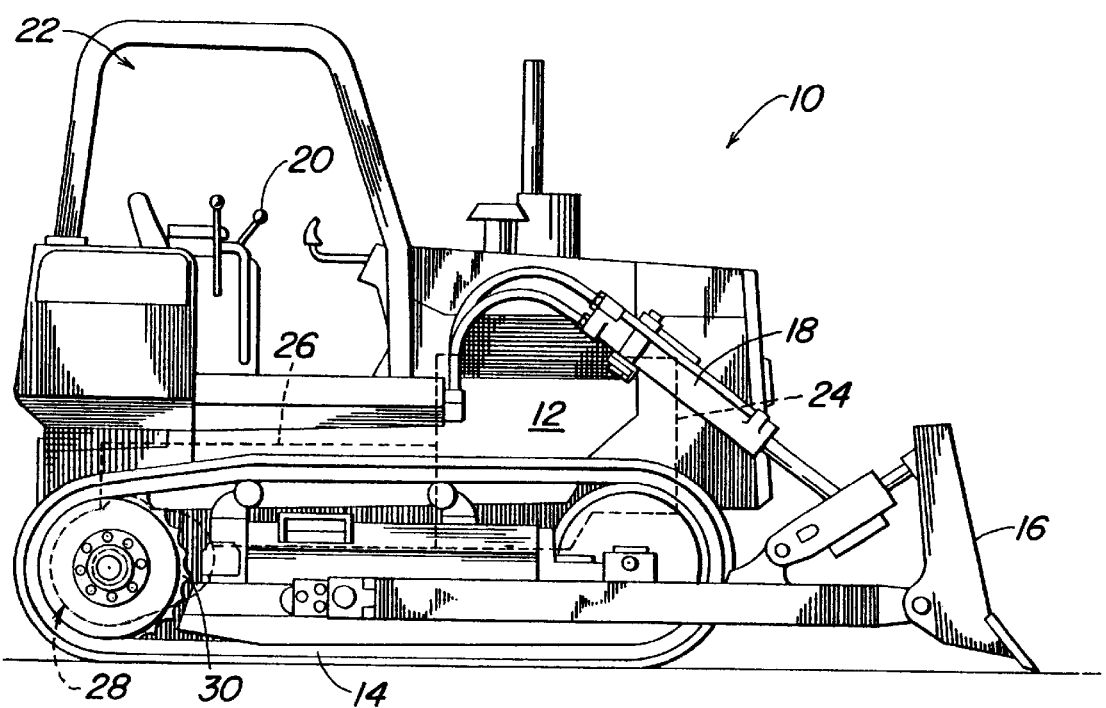
FIG. 1 is a side view of a bulldozer.
Figure 2:
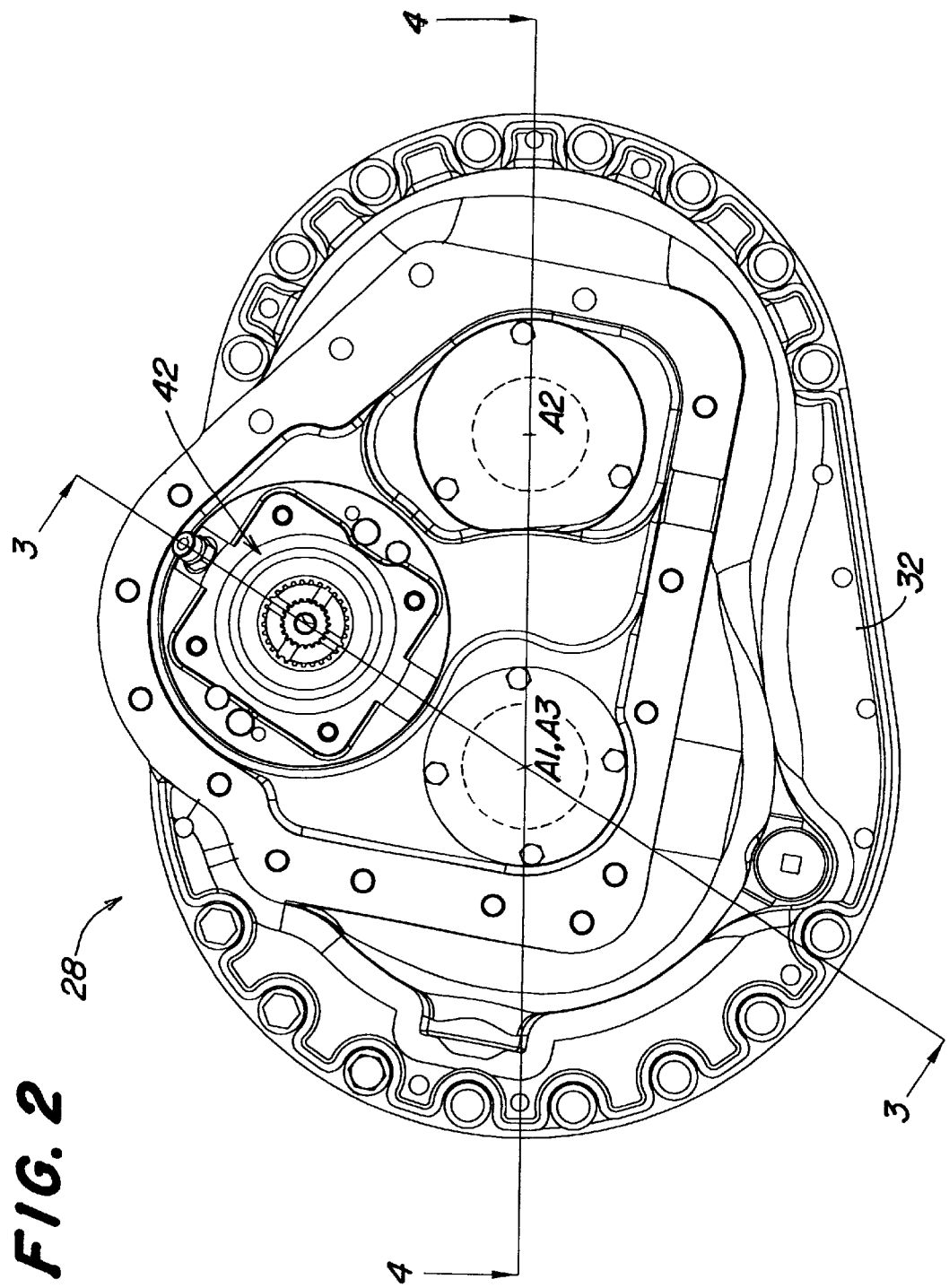
FIG. 2 is an inner side view of the final drive assembly.

FIG. 1 illustrates a work vehicle in the form of a crawler dozer 10. The crawler dozer 10 is provided with a supporting frame 12 and ground engaging tracks 14. The ground engaging tracks may be friction or positively driven rubber belts, or conventional steel tracks. In addition, ground engaging wheels may be used in place of ground engaging tracks 14 in wheeled work vehicle applications. The dozer 10 is provided with a working member or blade 16 the position of which is controlled by hydraulic cylinders 18. More specifically, the blade is raised and lowered by hydraulic cylinders 18, the position of which are controlled by the operator through T-bar control lever 20 located in operators area 22. The working implement may comprise a dozer blade, a loader bucket, a backhoe, a three point hitch or other implement for performing a work operation. The dozer is provided with an internal combustion engine 24 which drives transmission 26. The transmission drives right and left final drive assemblies 28 which in turn drives right and left drive sprockets 30 of the right and left ground engaging tracks 14. In a wheeled application, wheels can be substituted for drive sprockets 30 and tracks 14.

Figure 3:
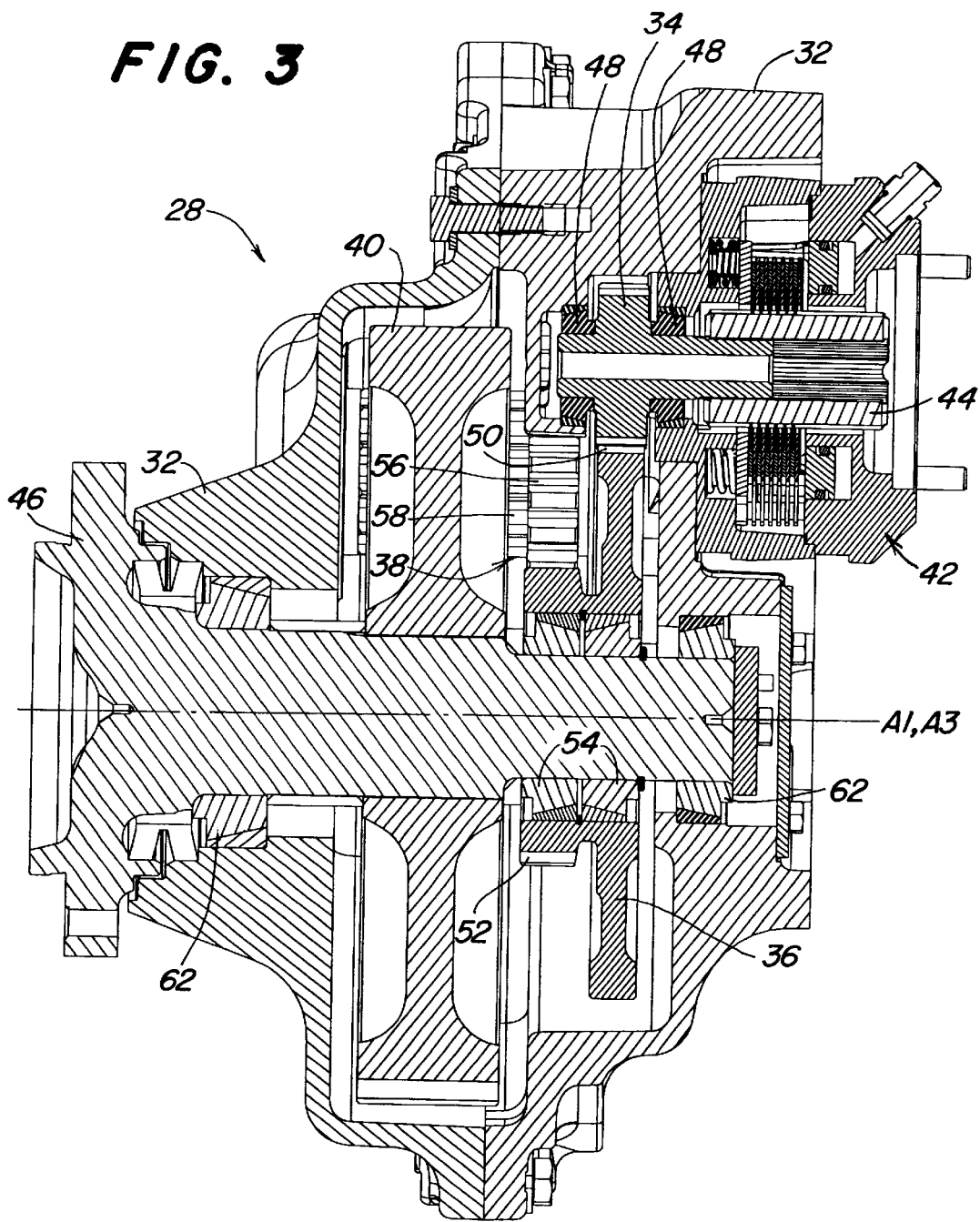
FIG. 3 is a cross sectional view taken along line 3—3 in FIG. 2.
Figure 4:
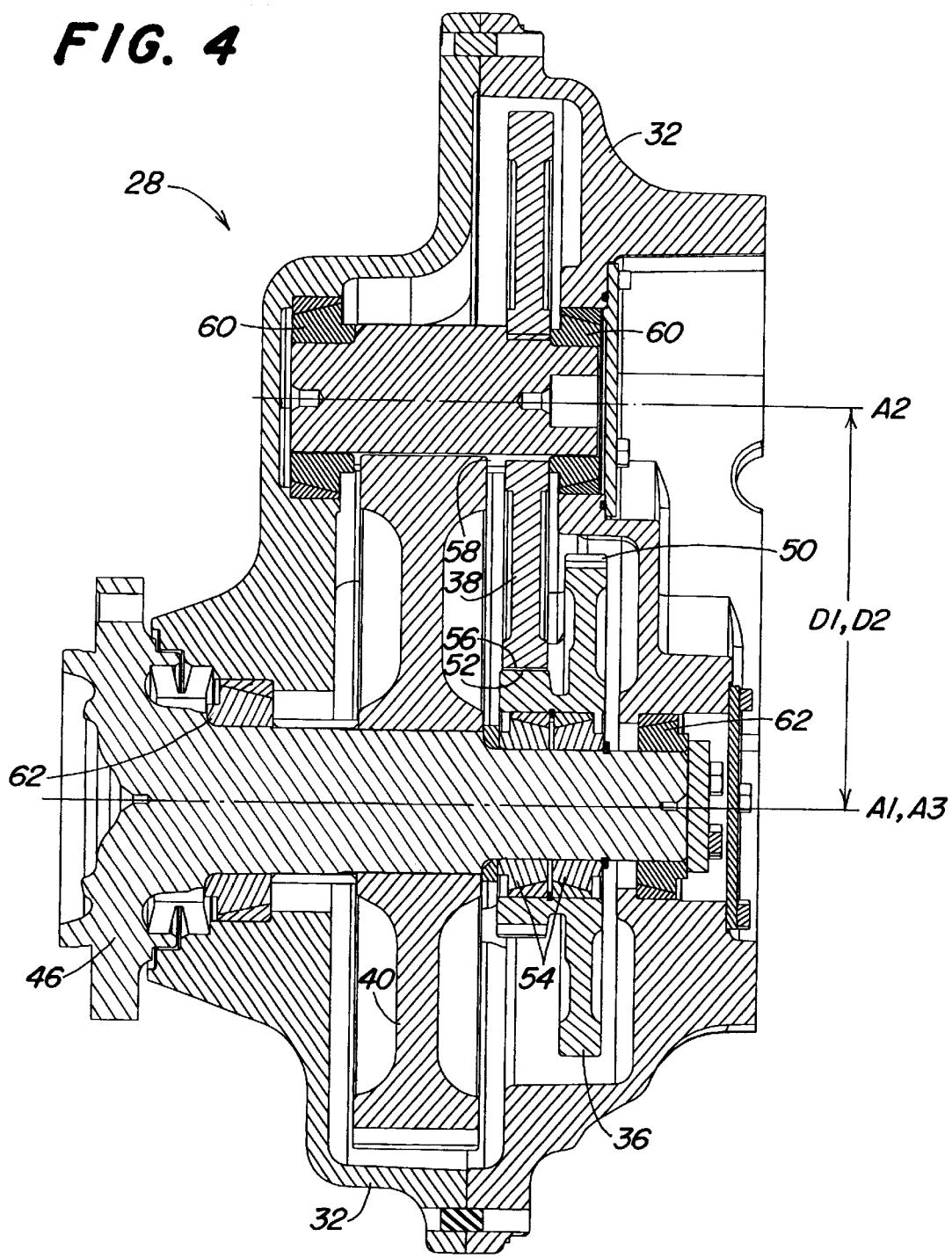
FIG. 4 is a cross sectional view taken along line 4—4 in FIG. 2.

The final drive assembly 28 is a triple reduction final drive. As illustrated in FIGS. 3 and 4, the final drive assembly 28 is provided with a housing 32 housing an input spur gear 34, a first cluster gear 36, a second cluster gear 38 and an output spur gear 40. The housing is also provided with a spring applied hydraulically released brake 42 which is operatively coupled to the input sleeve 44 of the input spur gear 34. The input sleeve has external splines for engaging the spring applied hydraulically released brake 42 and internal splines for engaging the input spur gear 34 and the output shaft from the transmission 26. The output spur gear 40 is provided with an output shaft 46 that extends outside the housing and is bolted to drive sprocket 30.

The input spur gear 34 is rotatively mounted in housing 32 by input spur gear bearings 48. The input spur gear is operatively coupled to the first cluster gear 36. The first cluster gear is a single integral part and is provided with a first toothed surface 50 engaging the input spur gear 34 and a second toothed surface 52. The first cluster gear 36 is rotatively mounted on annular bearings 54 which engage output shaft 46. The input spur gear 34 has an input spur gear radius that is smaller than the first cluster gear input radius of the first toothed surface 50 of the first cluster gear, thereby defining the first gear reduction. In addition, the first cluster gear defines a first cluster gear drive axis A1.

The second toothed surface 52 of the first cluster gear 36 operatively engages the first toothed surface 56 of the second cluster gear 38. The second cluster gear 38 is also provided with a second toothed surface 58 which operatively engages the output spur gear 40. The second cluster gear 38 is rotatively mounted on second cluster gear bearings 60 and defines a second cluster gear drive axis A2. The second toothed surface 52 of the first cluster gear 36 has a first cluster gear output radius that is smaller than the second cluster gear input radius of the first toothed surface 56 of the second cluster gear 38, thereby defining the second gear reduction. The second cluster gear 38 comprises two pieces, a pinion gear forming the second toothed surface 58 and a spur gear forming the first toothed surface 56. The pinion gear forming the second toothed surface 58 and a spur gear forming the first toothed surface 56 are rigidly attached to one another by a spline joint.

The second toothed surface 58 of the second cluster gear 38 has a second cluster gear output radius that is smaller than the output spur gear radius of the output spur gear 40, thereby defining the third gear reduction. The output spur gear 40 is rigidly attached to the output shaft 46 by a spline joint. The output shaft is rotatively mounted on output shaft bearings 62. The output spur gear 40 and output shaft 46 define an output spur gear drive axis A3, that in the preferred illustrated embodiment is coaxial with the first cluster gear drive axis A1. The first cluster gear drive axis and the second cluster gear drive axis define a first distance D1. The second cluster gear drive axis A2 and the output spur gear drive axis A3 define a second distance D2. Since drive axes A1 and A3 are coaxial D1 and D2 are equal. As illustrated in the figures all of the drive axes A1, A2 and A3 are parallel to one another.

The invention should not be limited by the above described embodiments, but should be limited solely by the claims that follow.

We claim:

1. A final drive assembly for a work vehicle, the final drive assembly comprising:

an input spur gear;

a first cluster gear having a first toothed surface and a second toothed surface, the first toothed surface engaging the input spur gear, the first cluster gear defining a first cluster gear drive axis;

a second cluster gear having a first toothed surface and a second toothed surface, the first toothed surface of the second cluster gear engaging the second toothed surface of the first cluster gear, the second cluster gear defining a second cluster gear drive axis that is parallel to the first cluster gear drive axis;

an output spur gear is provided with an output shaft and engages the second toothed surface of the second cluster gear, the output spur gear defining an output spur gear drive axis that is parallel to the second cluster gear drive axis, whereby the first cluster gear drive axis and the output spur gear drive axis are coaxial, the first cluster gear being provided with an annular bearing that engages the output shaft so that the first cluster gear is free to rotate on the output shaft.

2. A final drive assembly as defined by claim 1 wherein the first cluster gear is a single integral part.

3. A final drive assembly as defined by claim 2 wherein the second cluster gear comprises a spur gear that is rigidly coupled to a pinion gear so that rotation of the spur gear will rotate the pinion gear.

4. A final drive assembly as defined by claim 1 wherein the input spur gear and the first toothed surface of the first cluster gear define a first gear reduction and the second toothed surface of the first cluster gear and the first toothed surface of the second cluster gear define a second gear reduction, and the second toothed surface of the second cluster gear and the output spur gear define a third gear reduction.

5. A final drive assembly as defined by claim 4 wherein the input spur gear, the first cluster gear, the second cluster gear and the output spur gear are located in a housing having output shaft bearings on which the output shaft rotates, second cluster gear bearings on which the second cluster gear rotates and input spur gear bearings on which the input spur gear rotates.

6. A final drive assembly as defined by claim 5 wherein the housing is provided with a spring applied hydraulically released brake that engages the input spur gear.

7. A final drive assembly as defined by claim 6 wherein the input spur gear is provided with an input sleeve for engaging a rotating input shaft.

8. A final drive assembly as defined by claim 1 wherein the input spur gear has a input spur gear radius and the first toothed surface of the first cluster gear has a first cluster gear input radius that is larger than the input spur gear radius thereby defining a first gear reduction, the second toothed surface of the first cluster gear has a first cluster gear output radius and the first toothed surface of the second cluster gear has a second cluster gear input radius that is larger than the first cluster gear output radius thereby defining a second gear reduction, and the second toothed surface of the second cluster gear has a second cluster gear output radius and the output spur gear has an output spur gear radius that is larger than the second cluster gear output radius thereby defining a third gear reduction.

9. A triple reduction final drive assembly for a work vehicle, the triple reduction final drive assembly comprising:

a housing;

an input spur gear is rotatively located in the housing;

a first cluster gear is rotatively located in the housing, the first cluster gear having a first toothed surface and a second toothed surface, the first toothed surface engaging the input spur gear defining the first gear reduction;

a second cluster gear is rotatively located in the housing, the second cluster gear having a first toothed surface and a second toothed surface, the first toothed surface of the second cluster gear engaging the second toothed surface of the first cluster gear defining the second gear reduction;

an output spur gear is rotatively located in the housing, the output spur gear is provided with an output shaft and engages the second toothed surface of the second cluster gear defining the third gear reduction, whereby the first cluster gear is provided with an annular bearing that engages the output shaft so that the first cluster gear is free to rotate on the output shaft.

10. A triple reduction final drive assembly as defined by claim 9 wherein the housing is provided with a spring applied hydraulically released brake that engages the input spur gear.

11. A triple reduction final drive assembly as defined by claim 10 wherein the input spur gear is provided with an input sleeve for engaging a rotating input shaft.

* * * * *